(12) United States Patent
Zukawa et al.

(10) Patent No.: US 7,153,451 B2
(45) Date of Patent: *Dec. 26, 2006

(54) PHOSPHORS AND RELATED MANUFACTURING METHOD, DISPLAY DEVICE, AND FLUORESCENT LAMP

(75) Inventors: Takehiro Zukawa, Katano (JP); Masatoshi Kitagawa, Kyoto (JP); Masaharu Terauchi, Nara (JP); Junko Asayama, Suita (JP); Masahiro Sakai, Neyagawa (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 54 days.

This patent is subject to a terminal disclaimer.

(21) Appl. No.: 10/867,121

(22) Filed: Jun. 14, 2004

(65) Prior Publication Data

US 2005/0017218 A1  Jan. 27, 2005

(30) Foreign Application Priority Data

Jun. 13, 2003  (JP) .............................. 2003-169425

(51) Int. Cl.
*C09K 11/64* (2006.01)

(52) U.S. Cl. .............................. 252/301.4 R; 313/467; 313/468; 313/486

(58) Field of Classification Search ............. None
See application file for complete search history.

(56) References Cited

U.S. PATENT DOCUMENTS

| 3,939,377 | A | * | 2/1976 | Ignasiak ..................... 313/468 |
| 5,194,332 | A | * | 3/1993 | Kasenga et al. ............ 428/402 |
| 5,851,428 | A | * | 12/1998 | Matsuda et al. ...... 252/301.4 R |
| 2003/0107318 | A1 | | 6/2003 | Aoki et al. |

FOREIGN PATENT DOCUMENTS

EP          0 851 436          10/2002

* cited by examiner

*Primary Examiner*—C. Melissa Koslow

(57) ABSTRACT

Phosphors having high luminescence characteristics are provided while achieving manufacturing cost reductions by minimizing the usage amount of Eu, the luminescence center. Also provided are a display device (PDP, etc) and a fluorescent lamp having excellent display and/or luminescence characteristics as a result of using the phosphors, while achieving manufacturing cost reductions by minimizing the Eu usage amount.

4 Claims, 6 Drawing Sheets

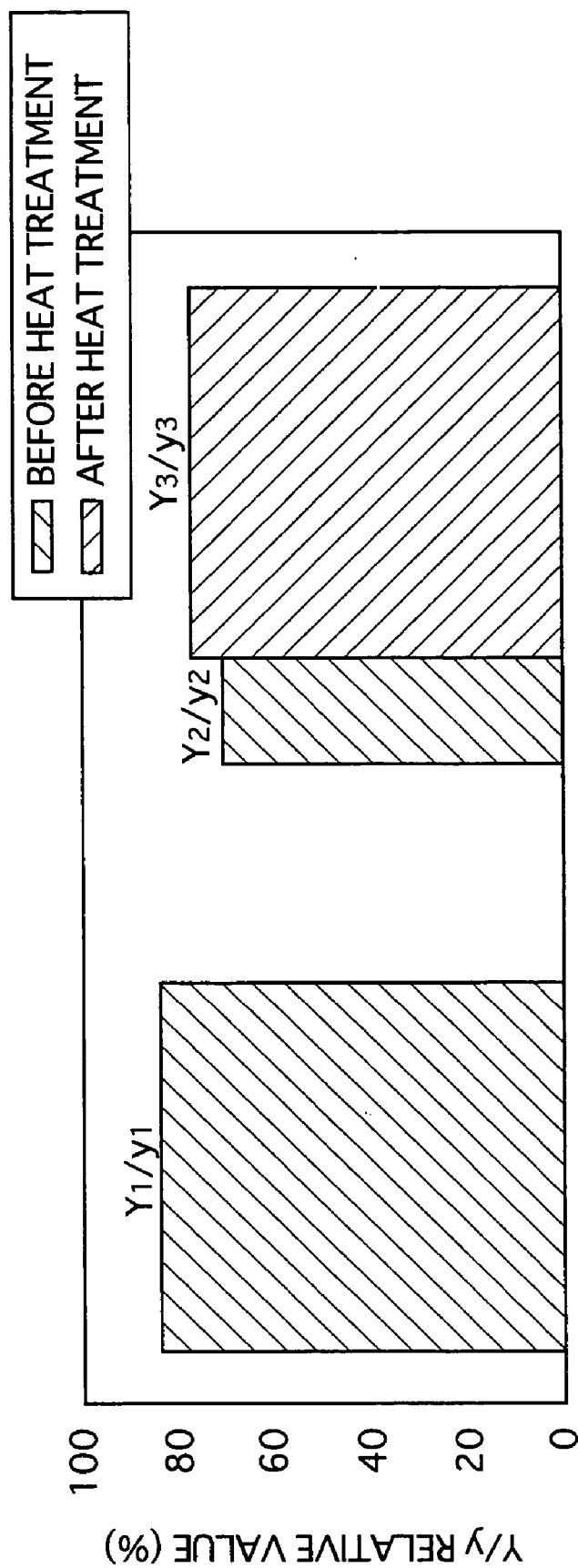

PHOSPHORS AND RELATED MANUFACTURING METHOD, DISPLAY DEVICE, AND FLUORESCENT LAMP

BACKGROUND OF THE INVENTION

1. Field of the Invention

The present invention relates to phosphors, a method for manufacturing the same, and a display device and a fluorescent lamp that use the phosphors, and more particularly to alkaline-earth metal aluminate phosphors and a method for manufacturing the same.

2. Related Art

In recent years, phosphors having Eu (europium) as a luminescence center have been applied as low energy phosphors for plasma display panels (PDPs), 3-wavelength fluorescent lamps, and the like.

The following compositions are given here as specific examples of such phosphors: $(Y,Gd)BO_3$:Eu, $Y_2O_2S$:Eu, $Y_2O_3$:Eu, $BaMgAl_{10}O_{17}$:Eu, $CaAl_2O_4$:Eu, $CaMgSi_2O_6$:Eu, $SrAl_{14}O_{25}$:Eu, $Sr_2P_2O_7$:Eu, $(Sr,Ca)B_4O_7$:Eu, $Ca_2B_5O_9Cl$:Eu, $Ba_{0.75}Al_{10}O_{17.25}$:Eu, $(Sr,Ca,Ba,Mg)_{10}(PO_4)_6Cl_2$:Eu, $InBO_3$:Eu, $(BaMg)Si_2O_5$:Eu, $YAl_3(BO_3)_4$:Eu, $LaAlO_3$:Eu (For a detailed description of phosphor compositions see, for example, *Phosphor Handbook* by Shigeo Shionoya and William M. Yen (CRC Press, 1999, pp. 392/833), and Japanese published patent applications No. 8-31325, No. 60-115683, No. 2001-55567 and No. 2001-35372.)

The emission color of these phosphors is adjusted by combining them with different colored phosphors, so as to achieve white luminescence, for example.

Of the above compositions, $BaMgAl_{10}O_{17}$:Eu phosphors have recently been widely applied in PDPs (i.e. type of gas discharge display panel), mercury-free fluorescent lamps and the like, making use of the superior visible luminescence characteristics of these phosphors under vacuum ultraviolet (VUV) excitation.

With PDPs, slurry made by mixing binder with phosphors is applied to a substrate (e.g. glass) and baked to form a phosphor screen consisting of phosphor layers.

Eu atoms are used as the luminescence center of these phosphor compositions, although the generally high cost of Eu raw material makes it desirable to minimize the amount of Eu used in the interests of reducing manufacturing costs.

Simply decreasing Eu, however, will likely have an adverse effect on the luminescence characteristics, since this equates to a reduction in the luminescence center material included in the phosphors.

SUMMARY OF THE INVENTION

A first object of the present invention is to provide phosphors having high luminescence characteristics and a method of manufacturing the same, while achieving manufacturing cost reductions by minimizing the usage amount of Eu, the luminescence center.

A second object is to provide a display device (PDP, etc), and a fluorescent lamp having excellent image display performance and/or luminescence characteristics at a relatively low price as a result of using the phosphors, while achieving manufacturing cost reductions by minimizing the amount of Eu used.

To achieve the above object, the present invention is Eu-activated phosphor particles, each having a higher Eu average density at and in a vicinity of a particle surface than other regions of the particle.

Alkaline-earth metal aluminate phosphors are given here as a specific example of phosphors according to the present invention.

The present invention may be alkaline-earth metal aluminate phosphor particles whose composition is $Ba_{1-x-y}M_xEu_yMgAl_{10}O_{17}$, where $0.0 \leq x \leq 0.2$ and $0.01 \leq y < 0.17$ for the particles as a whole, and $0.17 \leq y \leq 0.8$ at and in a near vicinity of the particle surface, M being one of Sr and Ca.

Alternatively, the alkaline-earth metal aluminate phosphor particles may set such that $0.05 \leq y < 0.17$ for the particles as a whole.

According to these structures, it is possible to substantially decrease the amount of Eu used, while maintaining luminescence efficiency at levels that compare favorably with conventional levels, as a result of maintaining the Eu average density at a certain level at and in a vicinity (or near vicinity) of the surface of the phosphor particles (i.e. areas contributing greatly to excitation luminescence), while decreasing the Eu average density comparatively in other areas. As a result, phosphors according to the present invention are extremely effectively in cost cutting, while having high luminescence efficiency.

Note that for the purposes of the present invention, "Eu average density" refers to the percentage of Eu atoms included as part of the phosphor constitution in a predetermined region of the phosphor particles, rather than to a localized density in the particles.

Note also that in the present description, Eu density is expressed as $X/(X+Y) \times 100(\%)$, where the Eu and Ba (barium) amounts included in the phosphor particles are X mole and Y mole, respectively.

If the phosphors of the present invention are used in gas discharge display panels such as PDPs, relatively low price devices having superior display performance can be realized because of balancing cost cutting and Eu usage in relation to the phosphors.

Likewise, if the phosphors of the present invention are used in fluorescent lamps, cheap gas fluorescent lamps having high luminescence efficiency can be realized.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings:

FIG. 6 shows luminescence efficiency ratios (pre/post baking sustain rates) derived for an embodiment example 5 and a comparative example 9.

DETAILED DESCRIPTION OF THE PREFERRED EMBODIMENTS

Embodiments of the present invention are described below with reference to the drawings.

1. Embodiment 1

1-1. Structure of Phosphor Particles

Figure 1:
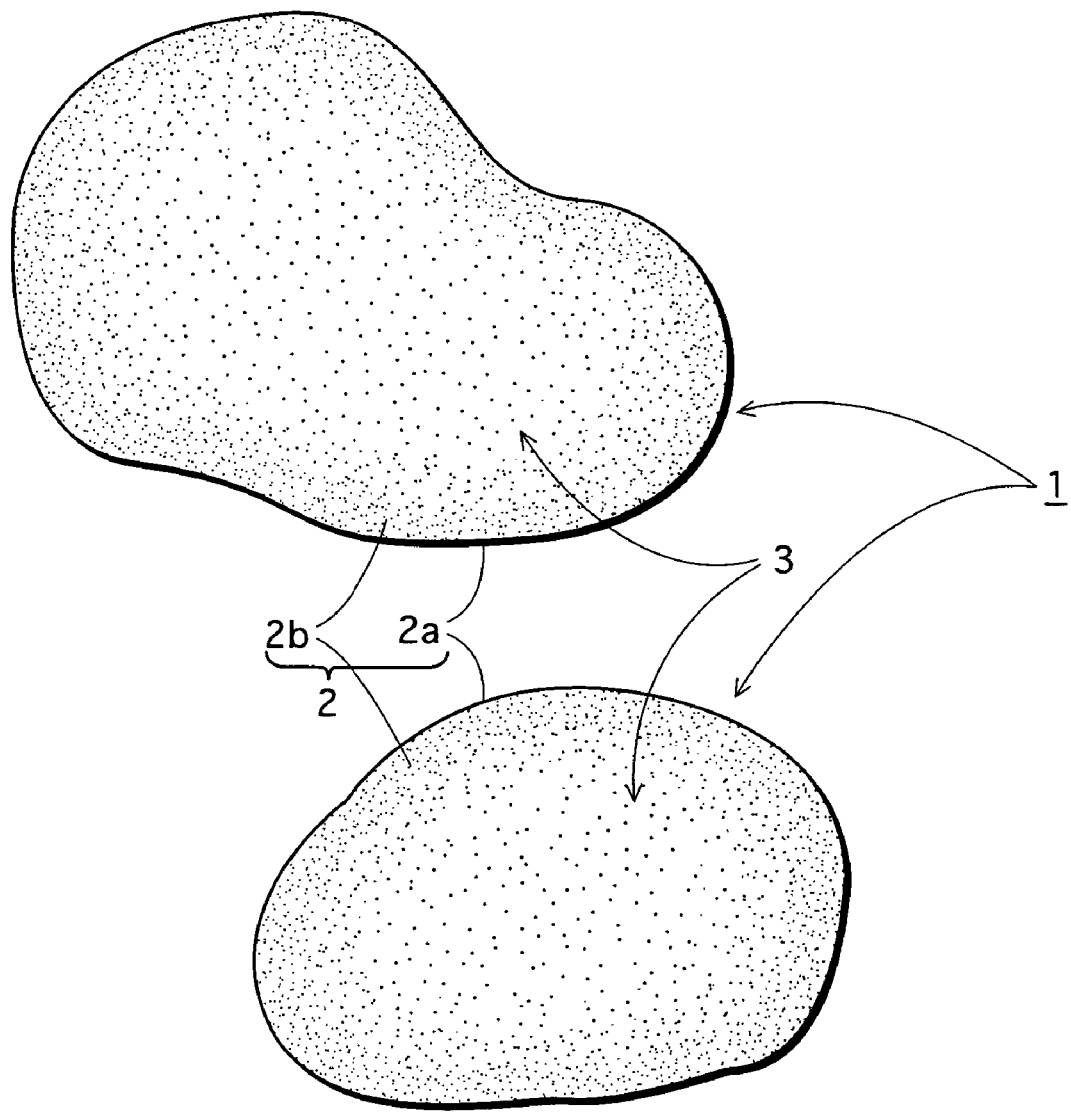
FIG. 1 is a schematic cross-sectional view showing a structure of phosphor particles according to an embodiment 1.

FIG. 1 is a schematic cross-sectional view showing a structure of phosphor particles according to embodiment 1.

The phosphor particles shown in FIG. 1 consist of alkaline-earth metal aluminate phosphors (i.e. vacuum ultraviolet phosphors) whose chemical formula is $BaMgAl_{10}O_{17}$:Eu.

A feature of phosphor particles 1 is that the Eu average density at a particle surface 2a and in a vicinity 2b of particle surface 2a is relatively higher than the Eu average density of the phosphor particles as a whole (i.e. individually or as a group), in terms of the density distribution of the Eu atoms, which are active atoms forming the luminescence center. In FIG. 1, this Eu density distribution is schematically represented by the black dots within phosphor particles 1.

The Eu average density of phosphor particles 1 is set in a range from 1.0 mol % inclusive to less than 17 mol % for the particles as a whole, and in a relatively higher range of 17 mol % to 80 mol % inclusive for particle surface 2a and surface vicinity 2b.

The Eu usage amount in phosphor particles 1 having the above structure is lowered as a result of the Eu average density reduction in a central region 3 (i.e. area not contributing significantly to luminescence), while the luminescence characteristics of the particles are secured by keeping the luminescence center (Eu) at a suitable density in regions 2a and 2b (i.e. areas 2 contributing the most under excitation).

Specifically, with conventional phosphor particles in which the Eu density at and in a vicinity of the particle surface is the same as the inner part of the particle, the luminescence characteristics are secured by setting the Eu average density for the particle as a whole in a range of 17 mol % to 80 mol % inclusive, for example. With phosphor particles 1, on the other hand, this conventional destiny range (17–80 mol %) is only maintained for particle surface 2a and surface vicinity 2b, which contribute the most to luminescence, thus allowing luminescence efficiency to be kept at a level that compares favorably with conventional levels, while the Eu average density in all other regions (i.e. those excluding regions 2a, 2b) is sharply decreased. This allows for both high luminescence efficiency and cost reductions to be realized.

As a result of their assiduous investigations, the inventors arrived at the structure of phosphor particles 1 after discovering that the region of the phosphors contributing effectively under excitation luminescence is limited to an area extending to a certain depth from the particle surface and focusing on the fact that the luminescence characteristics are not greatly effected by reductions in the Eu usage amount beyond this certain depth.

Here, "surface vicinity 2b" refers to the region that is excited to emit light upon phosphor particles 1 receiving short wavelength light such as VUV. Specifically, surface vicinity 2b is a surface area having a thickness range of up to around 50 nm in from particle surface 2a. Given, however, that the depth at which energy penetrates into phosphor particles 1 varies depending on the wavelength of the excitation light, surface vicinity 2b may exceed this 50 nm thickness range.

The alkaline-earth metal aluminate phosphors ($BaMgAl_{10}O_{17}$:Eu, $Ba_{0.75}Al_{10}O_{17.25}$:Eu, etc.) given in embodiment 1 have a high luminescence efficiency in comparison with other phosphors, making them suitable for light fittings, image display devices, and the like. In other words, it is possible to deliver excellent luminescence and/or image display performance by applying these alkaline-earth metal aluminate phosphors in non-mercury lamps (e.g. fluorescent lamps) and gas discharge display panels (e.g. PDPs) that use VUV excitation.

While discharge deterioration over time is an ongoing problem with non-mercury lamps and PDPs, with phosphor particles 1 the Eu average density of particle surface 2a and surface vicinity 2b is maintained at a level equivalent to conventional phosphor particles, thus enabling the deterioration characteristics to be kept at conventional levels.

The above phosphors ($BaMgAl_{10}O_{17}$:Eu) are merely an example of phosphors according to the present invention. The composition of phosphors according to the present invention when applied in alkaline-earth metal aluminate phosphors can be defined materially as:

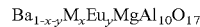

$$Ba_{1-x-y}M_xEu_yMgAl_{10}O_{17}$$  Definition 1

Here, in an average composition, x and y are set in the respective ranges $0.0 \leq x \leq 0.2$ and $0.01 \leq y < 0.17$ for the phosphor particles as a whole, while y is set in the range $0.17 \leq y \leq 0.8$ for regions 2a and 2b.

In the above composition, "M" is one of Sr (strontium) and Ca (calcium). The numerical ranges of these elements are determined using embodiment examples, measurement experimentation and the like described below.

The structure of phosphor particles 1 is particularly effective if applied in phosphors for VUV-excitation, given that VUV light does not easily penetrate the inner part of phosphor particles. However, similar effects can be produced using other excitation methods, since the inner part of phosphor particles is generally difficult to penetrate even with UV having a 254 nm wavelength, for example. Consequently, the present invention is not limited to VUV-excited phosphors.

The Eu density distribution of phosphor particles 1 is not limited to the exemplary structure shown in FIG. 1 in which the density decreases in gradations toward the inner part of the particles. For example, a structure in which the Eu average density decreases in steps of a predetermined depth from the particle surface inward is also acceptable.

The phosphor particles of the present invention are particularly easy to produce with alkaline-earth metal aluminate phosphor compositions. The reasons for this are speculated as follows.

The crystal structure of alkaline-earth metal aluminate phosphors is often layered. In this layered structure, the Eu atoms forming the luminescence center exist as a result of a number of alkaline-earth metal aluminate atoms being replaced.

In their investigations, the inventors discovered that with the layered structure of the phosphors, the alkaline-earth metal aluminate atoms and the replacement Eu atoms move about relatively freely in the crystals, and that the density distributions of Eu and alkaline-earth metal aluminate readily change when thermal energy is applied to the phosphors in a baking process during manufacture. If, at this time, the Eu atoms are disposed close to the surface of the phosphor particles, the Eu average density at and in a vicinity of the particle surface can be easily raised. A detailed description of this method is given in a later section.

Here, the "phosphor particles" of the present invention, as shown in FIG. 1, are what are simply referred to in the market as "particles"; that is, primary particles obtained by powderizing (used here to refer to breaking up or separating clustered particles) the result of a baking process during manufacturing. Thus this term does not refer to particles formed by crushing the primary particle or to secondary particles formed by the bonding of a plurality of primary particles.

1-3. Manufacture of Alkaline-Earth Metal Aluminate Phosphors

Described here is an exemplary manufacturing method for the phosphors (alkaline-earth metal aluminate phosphors) of the present invention. Note that this method is not particularly restricted except in relation to the baking process. Generally, it is sufficient to combine the raw materials to obtain a predetermined composition.

1-3-1. Material Selection

An aluminum compound such as high-purity (at least 99%) aluminum hydroxide, aluminum nitrate or aluminum halide that becomes aluminate upon baking can be used as the aluminum source. High-purity (at least 99%) aluminate (the crystal form of which may be α-alumina or an intermediate alumina) may also be directly used.

A barium compound such as high-purity (at least 99%) barium hydroxide, barium carbonate, barium nitrate, barium halide or barium oxalate that becomes barium oxide upon baking can be used as the barium source. High-purity (at least 99%) barium oxide may also be used.

A calcium compound such as high-purity (at least 99%) calcium hydroxide, calcium carbonate, calcium nitrate, calcium halide or calcium oxalate that becomes calcium oxide upon baking can be used as the calcium source. High-purity (at least 99%) calcium oxide may also be used.

A strontium compound such as high-purity (at least 99%) strontium hydroxide, strontium carbonate, strontium nitrate, strontium halide or strontium oxalate that becomes strontium oxide upon baking can be used as the strontium source. High-purity (at least 99%) strontium oxide may also be used.

A magnesium compound such as high-purity (at least 99%) magnesium hydroxide, magnesium carbonate, magnesium nitrate, magnesium halide or magnesium oxalate that becomes magnesium oxide upon baking can be used as the magnesium source. High-purity (at least 99%) magnesium oxide may also be used.

A europium compound such as high-purity (at least 99%) europium hydroxide, europium carbonate, europium nitrate, europium halide or europium oxalate that becomes europium oxide upon baking can be used as the europium source. High-purity (at least 99%) europium oxide may also be used.

The raw materials can be mixed using, for example, an agitator or V-type mixer normally used in industry, or a ball mill, vibration mill or jet mill that has a powderizing function.

A phosphor mixture is thus obtained.

1-3-2. Baking Process

The phosphor particles of the present invention are manufactured so that the Eu average density in regions $2a$ and $2b$ of the particles is higher than the Eu average density of the particles as a whole. Also, the average particle diameter preferably is set to ultimately be in a range of 0.1 μm to 20 μm inclusive, taking into consideration workability similar to the prior art.

Broadly speaking, there is a choice between two baking processes in forming phosphor particles having regions with different Eu densities.

The first of these methods involves making elementary particles from phosphors having a low Eu average density, and encapsulating the elementary particles with a thin film having a high Eu average density, or directly applying a phosphor powder having a high Eu average density around the elementary particles and using heat treatment to diffuse the powder.

The second method involves making elementary particles from phosphors having a low Eu average density, and forming a region of high Eu average density around the outside of the central part of each particle by reforming particle surface $2a$ and surface vicinity $2b$ through heat treatment in a controlled baking atmosphere. As far as controlling the baking atmosphere is concerned, the Eu average density at the surface of the phosphor particles can be raised by creating an inert gas atmosphere (e.g. atmosphere including only nitrogen) when the atmospheric temperature is being reduced, in the baking profile at a time of synthesizing the phosphors.

A detailed description of the second of these two baking processes is given below, since this is the method used in making the phosphor particles of embodiment 1.

The baking oven used in this baking process may be either a continuous or batch type electric or gas oven (e.g. pressure oven) commonly used in industry.

While the baking atmosphere can be nitrogen, argon, or a mixture of these, it is preferable to use a reducing atmosphere that contains hydrogen in a range of 0.1 vol % to 10 vol % inclusive.

Firstly, as an initial step, phosphor materials mixed at amounts in which the Eu average density is slightly lower than the optimal density are baked to synthesize the phosphors. The result is the elementary particles used as a basis for forming the phosphor particles in the present invention.

Next, as a second step, the elementary particles are cooled in an inert gas atmosphere. It is possible, in this second step, to raise the Eu average density in regions $2a$ and $2b$ of the particles.

Note that the heat treatment relating to this second step preferably is performed in an oxygen atmosphere at a temperature in a range of 500° C. to 1100° C. inclusive. Here, if the heat treatment is performed in an oxygen atmosphere exceeding 1100° C., the Eu oxidizes, resulting in a notable fall in the luminescence characteristics. Also, care is needed to avoid the particle surface being reformed more than once in the manufacturing process even at temperatures below 500° C., since the manufacture of light fittings, image display devices and the like generally includes a process in which the phosphors are heated to around 500° C.

Since the Eu in phosphors oxidizes even under high temperature conditions of 1100° C. or less, luminescence improvements resulting from an increased Eu average density in the second step are generally accompanied by a deterioration in the luminescence characteristics due to Eu oxidization. Changes in the heat treatment temperature, the atmosphere and other conditions are thus required, depending on the density of the Eu being synthesized, the compound materials, and the like.

Also, the oxygen atmosphere is not limited in particular to being an air atmosphere. For example, it is acceptable to control the oxygen density, or to preserve a reducing atmosphere for a certain time period.

Furthermore, in order to avoid the Eu being oxidized by the heat treatment relating to the second step, the heat treatment process may be performed in a non-equilibrium state such as with plasma or the like. In other words, heat treatment at a low temperature is made possible by performing the heat treatment process after using plasma to form a non-equilibrium state by raise the reactivity of the oxygen atmosphere and the Eu raw material. If the reactivity of the oxygen atmosphere and the Eu raw material is raised prior to the heat treatment process, the heating temperature can be kept in a range of 100° C. to 500° C. inclusive, thus preventing a fall in the luminescence characteristics resulting from undesirable Eu oxidation.

Also, even when baking is performed to eliminate binder at temperatures of 400° C. to 500° C. inclusive, it is possible to reduce any oxidation, thus allowing for alkaline-earth metal aluminate phosphors having excellent emission colors to be obtained.

Furthermore, heat treatment according to the present invention can be performed at very low temperatures, even in the second step, if performed after irradiating the Eu raw material with UV in an oxygen atmosphere to raise the reactivity of oxygen and the Eu raw material.

This second baking process is particularly effective when applied in relation to alkaline-earth metal aluminate phosphors having a layered crystal structure and a composition that includes, through replacement, Eu as well as alkaline-earth metal. The reason for this particular effectiveness is surmised as being due to the fact that the density distribution of Eu and alkaline-earth metal can be readily changed by energizing the phosphors, as a result of the alkaline-earth metal atoms and the replacement Eu atoms having good mobility in the crystals in the case of a layered structure.

In particular, with alkaline-earth metal aluminate phosphors whose material composition is $Ba_{1-x-y}M_xEu_yMgAl_{10}O_{17}$, the replacement of Eu atoms for alkaline-earth metal atoms is especially facilitated, allowing for excellent effects to be produced by the present invention. This replacement of atoms also occurs with other types of phosphors, not just with alkaline-earth metal aluminate phosphors.

Making use of this characteristic, adjustments are made with the present invention to comparatively raise the Eu average density at and in a vicinity of the surface of the particle particles, while decreasing the Eu average density of inner regions (i.e. areas excluding the surface regions).

When a material that oxidizes when baked, such as hydroxide, carbonate, nitrate, halide or oxaluria, is used in the composition as an alkaline-earth metal aluminate phosphor raw material, a preliminary bake can be performed in a temperature range of 600° C. to 800° C. prior the actual baking. The preliminary bake preferably is carried out in a weak reducing atmosphere, so as to ionize Eu atoms ($Eu \rightarrow Eu^{2+}$). Also, after initially baking in an air atmosphere, the baking can again be performed in a weak reducing atmosphere. This weak reducing atmosphere may, for example, be a nitrogen atmosphere that contains hydrogen at 2.0 vol %.

Flax can also be added to speed up the reaction. Re-baking is also a possibility in order to enhance the crystallization of the phosphors.

2. Embodiment 2

2-1. PDP Structure

Figure 2:
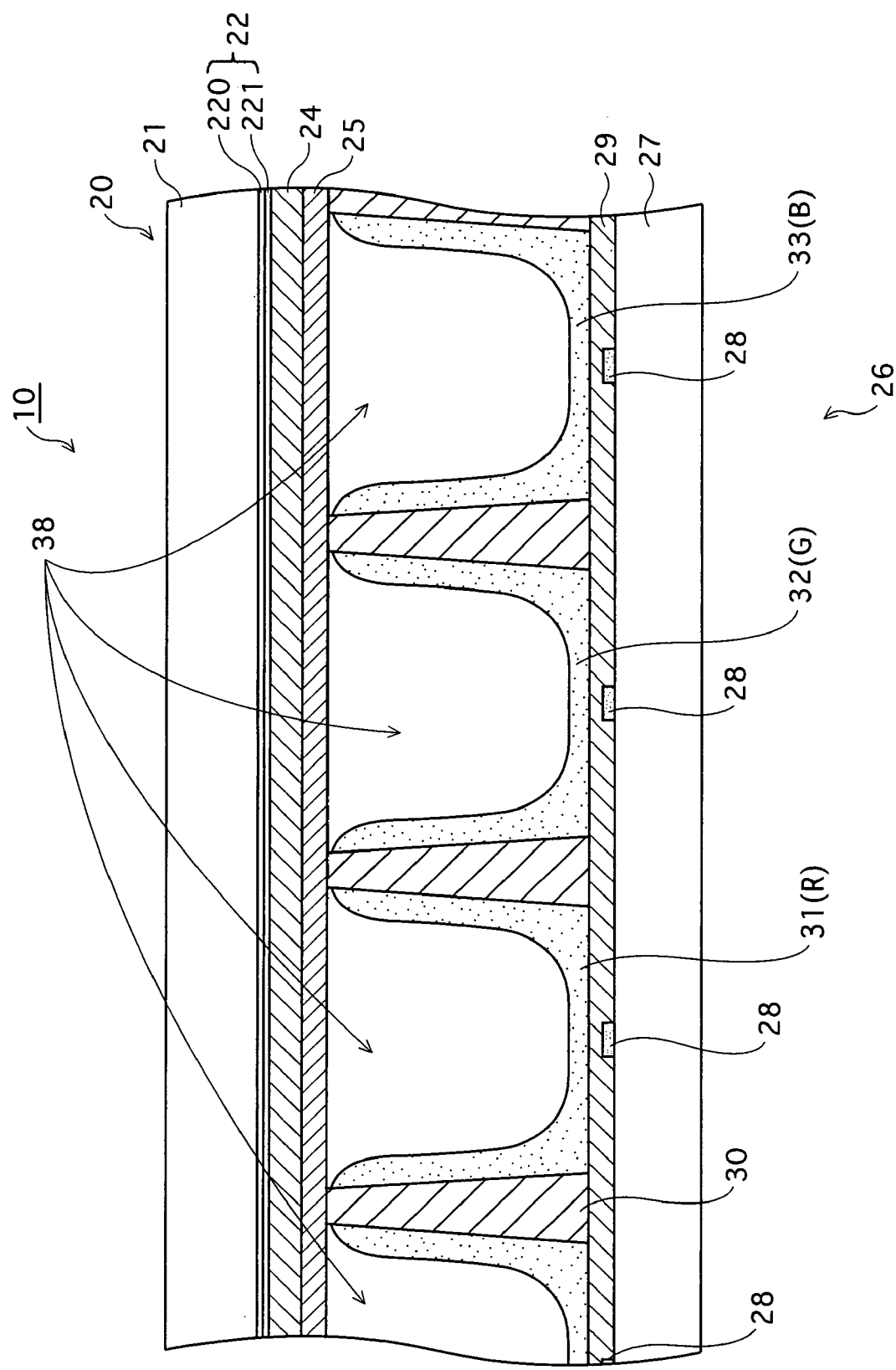
FIG. 2 shows a structure of a PDP according to an embodiment 2.

FIG. 2 is a partial cross-section view of a main structure of an alternating-current (AC) surface discharge PDP (hereinafter, PDP 10) pertaining to embodiment 2. The size of PDP 10 is, as one example, set in accordance with 42-inch class VGA (video graphics array) specifications, although the present invention may, of course, be applied to other sizes.

As shown in FIG. 2, the PDP structure is broadly divided into a front panel 20 and a back panel 26 that are disposed with main surfaces facing one another.

On front panel glass 21, which forms the substrate of front panel 20, are arranged plural pairs of display electrodes 22 and 23 (X and Y electrodes, respectively), formed by layering bus-lines 221 and 231 (7.0 μm thick, 95 μm wide) on band-shaped transparent electrodes 220 and 230 (0.1 μm thick, 150 μm wide). Note that elements 23, 230 and 231 are hidden from view in FIG. 2 due to their being positioned on the inside of elements 22, 220 and 221).

The pairs of display electrodes 22 and 23 are electrically connected to a panel drive circuit (not depicted) at the ends thereof (i.e. the left/right ends as seen in FIG. 2). Y electrodes 22 are connected collectively to the panel drive circuit, while X electrodes 23 are connected independently. When power is fed to Y electrodes 22 and specific X electrodes 23 from the panel drive circuit, a surface discharge (sustain discharge) is performed in the gap (approx. 80 μm) between the X and Y electrodes to which power is fed.

Furthermore, X electrodes 23, which also operate as scan electrodes, are structured to perform a write discharge (address discharge) with address electrodes 28.

A dielectric layer 24 (approx. 30 μm thick) is coated on the front panel glass surface on which the pairs of display electrodes 22 and 23 are disposed, so as to cover the display electrodes.

Over dielectric layer 24 is laid a protective layer 25 (approx. 1.0 μm thick).

On back panel glass 27, which forms the substrate of back panel 26, is arranged a plurality of address electrodes 28 (5.0 μm thick, 60 μm wide) that extend perpendicular to the surface of FIG. 2. The pitch between adjacent address electrodes is regular (approx. 150 μm).

Address electrodes 28 are connected independently to the panel drive circuit, with power being fed separately to each address electrode. An address discharge is performed between specific address electrodes 28 and X electrodes 23.

A dielectric film 29 (30 μm thick) is coated on the back panel glass surface on which address electrodes 28 are arranged, so as to cover the address electrodes.

On dielectric film 29 are arranged barrier ribs 30 (150 μm high, 40 μm wide) in between and extending in the same direction as the address electrodes.

On the sides of adjacent barrier ribs 30 and the surface of dielectric film 29 between the barrier ribs are formed phosphor layers 31 to 33, each of which corresponds, in order, to the colors red (R), green (G) and blue (B). RGB phosphor layers 31 to 33 are repeated in a direction orthogonal to barrier ribs 30 (i.e. left to right direction on the page).

The front panel 20 and back panel 26 are positioned facing each other with address electrodes 28 orthogonal to display electrodes 22 and 23, and fixed together around their respective perimeters. The space between the two panels is thus sealed.

The space between panels 20 and 26 is filled, at a predetermined pressure (commonly approx. $6.7 \times 10^4$ to $1.0 \times 10^5$ Pa), with a discharge gas formed from a rare gas component selected from the group consisting of He (helium), Xe (xenon), and Ne (neon). The space corresponding to the gap between adjacent barrier ribs 30 is a discharge space 38.

Also, the area where a pair of display electrodes 22 and 23 extend across a single address electrode 28 with a display space 38 interposed therebetween corresponds to a cell relating to image display.

As one example, the pitch of the cells is set to 1080 μm×360 μm. Three adjacent cells in the left/right direction on the page constitutes a single pixel (1080 μm×1080 μm).

To drive PDP 10 having the above structure, firstly a pulse voltage is applied to specific address and X electrodes using the panel drive circuit, to generate an address discharge. Then, after the address discharge, shortwave UV light (resonant lines having a center wavelength of approx. 147 nm) is generated by applying a pulse between the pairs of discharge electrodes 22 and 23 to generate a sustain discharge. The phosphors included in phosphor layers 31 to 33 emit visible light as a result of the UV irradiation, allowing image displayed to be performed.

2-2. Phosphor Layers

In terms of the phosphors packed in phosphor layers 31 to 33 of PDP 10, phosphors having a common composition are used as the red and green phosphors, while blue phosphor layer 32 is packed with phosphor particles having a similar structure to embodiment 1.

In other words, a feature of the phosphor particles used in blue phosphor layer 32 is that the Eu average density at and in a vicinity of the particle surface is higher than the Eu average density of the particles as a whole (i.e. either individually or as a group).

The composition of the phosphor particles in blue phosphor layer 32 as a whole is as follows:

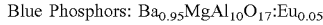

Blue Phosphors: $Ba_{0.95}MgAl_{10}O_{17}:Eu_{0.05}$

The composition of the phosphor particles in blue phosphor layer 32 at and in a vicinity of the particle surface is as follows:

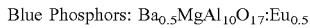

Blue Phosphors: $Ba_{0.5}MgAl_{10}O_{17}:Eu_{0.5}$

The thickness range of the region corresponding to the particle surface and the surface vicinity of these phosphor particles is here, as one example, around 50 nm, although it may be thinner. The thickness range of this surface region at and in a vicinity of the particle surface preferably is at least as thick as the depth reached by the excitation luminescence of the short wavelength light (e.g. VUV light) when PDP 10 is driven. Note that the average particle diameter of the phosphor particles preferably is in a range of 0.1 μm to 20 μm inclusive.

With the phosphor particles used in phosphor layer 32, the Eu average density is set in a range from 1.0 mol % inclusive to less than 17 mol % for the particles as a whole (restated, this equates to a composition ratio of Ba:Eu:Mg:Al=1−Eu:0.05 to 0.17:1:10), and in a range of 17 mol % to 80 mol % inclusive at and in a vicinity of the particle surface. These figures given for the Eu average density show optimal ranges derived through experimentation.

With PDP 10 using phosphor layer 32 formed from phosphor particles having the above structure, the securing of reductions in the costs associated with expensive Eu raw material is sought firstly by reducing the Eu usage amount for the particles as a whole. By cutting back on the use of Eu in areas other than at and in a vicinity of the surface of the particles, it is possible to achieve significant cost reductions.

Note that in order to obtain an excellent cost reduction effect with the present invention, it is naturally preferable to suppress, to a greater extent than conventionally achieved, the Eu average density for the phosphor particles as a whole, in comparison with the Eu average density at and in a vicinity of the particle surface, and to decrease the Eu usage amount for phosphor layer 32 as a whole.

However, the Eu average density in the phosphor layers needs to be kept within an appropriate density range, outside of which sufficient luminescence characteristics will not be obtained. Here, with the VUV phosphors at and in a vicinity of the surface of phosphor layer 32 (i.e. the main luminescence region), characteristics that fully satisfy the luminescence characteristics of the surface vicinity are obtained by setting the luminescence center density (i.e. Eu density) for the particle surface and vicinity thereof in a suitable density range.

Because high luminescence characteristics are obtained particularly at and in a vicinity of the surface of the phosphor particles, the present invention is extremely effective in alkaline-earth metal aluminate phosphors under VUV excitation. However, since the surface of the phosphors affects the luminescence characteristics as a result of giving off light, even when excited by UV having a 254 nm wavelength, for example, the present invention is not limited to VUV phosphors.

Also, the alkaline-earth metal aluminate phosphors, not being limited to use in phosphor layer 32 of PDP 10, may be applied in an image display device (e.g. projector) that conducts visible light emission through UV irradiation.

Also, the phosphor particles of the present invention may be structured such that the Eu average density gradually decreases in gradations from the particle surface toward the center of the particles. Alternatively, the Eu average density may be decreased over a number of steps.

3. Embodiment 3

The phosphor particles of the present invention may also be applied in a fluorescent lamp that emits visible light through UV irradiation.

Figure 3:
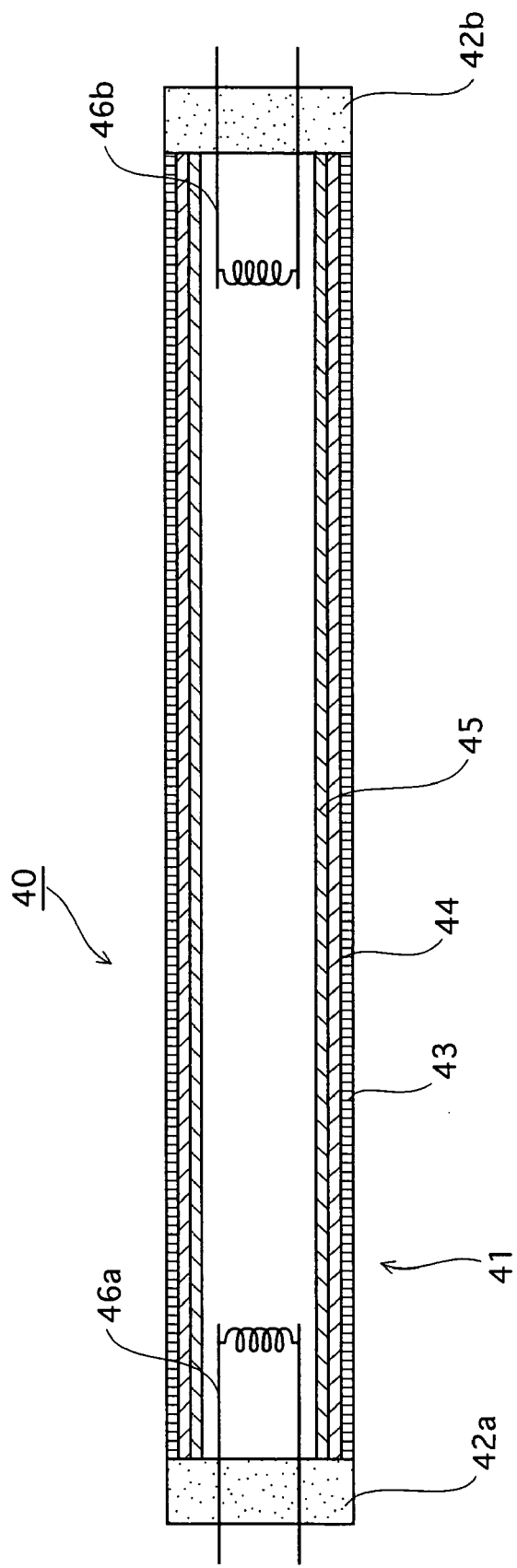
FIG. 3 shows a structure of a fluorescent lamp according to an embodiment 3.

FIG. 3 shows an exemplary structure of a 40-watt straight-tube fluorescent lamp 40 (hereinafter, simply "lamp 40") according to embodiment 3.

As shown in FIG. 3, lamp 40 includes a glass tube 41 (32 mm tube diameter), at either end of which is disposed an electrode (46a, 46b) that is coated with an electron emission material and includes a tungsten filament coil (WFL). The inside of tube 41 is sealed airtight by capping parts 42a and 42b.

On the inner surface 43 of glass tube 41 is formed, as a so-called protective film, an aluminum oxide foil 44 (0.1–0.5 μm thick) constituted from fine alumina particles, and on the surface of foil 44 is formed a phosphor film (layer) 45 constituted to include red, blue and green phosphors.

Alkaline-earth metal aluminate phosphors having an Eu luminescence center similar to PDP 10 of embodiment 2 are used in the blue phosphors included in phosphor film 45.

Here, with lamp 40 of embodiment 3, the structure of the phosphor particles used in phosphor film 45 is similar to that of the phosphor particles in embodiment 2, and the Eu average density at and in a vicinity of the surface of the particles is higher than the Eu average density of the particles as a whole.

With the phosphor particles included in phosphor film 45, the Eu average density is set in a range from 1.0 mol % inclusive to less than 17 mol % for the film as a whole, and in a range of 17 mol % to 80 mol % inclusive at and in a vicinity of the particle surface. These figures for the Eu average density show optimal value ranges derived through experimentation.

With lamp 40 using phosphor film 45 having the above structure, decreasing the added amount of Eu for the phosphor particles as a whole in comparison with convention particle structures means that cost reductions in relation to expensive Eu raw material are definitely achieved. Cutting back on Eu usage in areas of the particles other than the particle surface and vicinity thereof makes it possible to achieve significant cost reductions.

On the other hand, at and in a vicinity (i.e. depth reached by UV generated in glass tube 41) of the surface of the phosphor particles, this being the area of phosphor film 45 contributing the most to visible light emission, the Eu average density is comparatively higher than that of the particles as a whole. As a result, it is possible to obtain luminescence brightness that compares favorably with conventional levels, and excellent luminescence characteristics.

Note that in order to obtain an excellent cost reduction effect with embodiment 3, it is naturally possible to suppress the Eu average density of the phosphor particles as a whole below conventional levels, in comparison with the Eu average density at and in a vicinity of the particle surface, and to decrease Eu usage for phosphor film 45 as a whole.

Here, a phosphor film (layer) according to the present invention, not being limited to use in straight-tube fluorescent lamp 40, may be applied in any of a variety of lamps that conduct visible light emission though UV irradiation, examples of which include tubular and compact fluorescent lamps.

Also with embodiment 3, the phosphor particles may be structured such that the Eu average density gradually decreases in gradations from the particle surface toward the center of the particles. Alternatively, the Eu average density may be decreased over a number of steps.

4. Performance Evaluation Experiments

Performance evaluation experiments comparing the alkaline-earth metal aluminate phosphors of the present invention with the conventional phosphor compositions are described here. Embodiment examples were manufactured by firstly making phosphor particles (i.e. elementary particles) constituted from components having a lower Eu average density than conventional phosphors, and then forming a component having a high Eu average density over the surface of the elementary particles.

4-1. COMPOSITION OF EMBODIMENT AND COMPARATIVE EXAMPLES

The phosphor raw materials and mixed amounts with respect to embodiment examples 1 to 4 were set as described below, as exemplary phosphors according to the present invention expressed by the above definition 1. The phosphor raw materials were firstly mixed and then baked (1400° C. max. temp. for 2 hrs in 10 vol % $H_2/N_2$ atmosphere). The clustered phosphors after baking were then subjected to powderizing (i.e. breaking up of clustered particles), sizing and drying processes. The divalent alkaline-earth metal aluminate phosphors thus obtained as elementary particles are expressed by the following chemical formula:

Embodiment Example 1 (Elementary Particle Eu Average Density: 10 mol %)

| | |
|---|---|
| $BaCO_3$ | 0.9 mol |
| MgO | 1.0 mol |
| $Al_2O_3$ | 5.0 mol |
| $Eu_2O_3$ | 0.05 mol |
| $AlF_3$ | 0.05 mol | chemical formula: $Ba_{0.9}MgAl_{10}O_{17}{:}Eu_{0.1}$

Embodiment Example 2 (Elementary Particle Eu Average Density: 17 mol %)

| | |
|---|---|
| $BaCO_3$ | 0.83 mol |
| MgO | 1.0 mol |
| $Al_2O_3$ | 5.0 mol |
| $Eu_2O_3$ | 0.085 mol |
| $AlF_3$ | 0.05 mol | chemical formula: $Ba_{0.83}MgAl_{10}O_{17}{:}Eu_{0.17}$

Embodiment Example 3 (Elementary Particle Eu Average Density: 5.0 mol %)

| | |
|---|---|
| $BaCO_3$ | 0.95 mol |
| MgO | 1.0 mol |
| $Al_2O_3$ | 5.0 mol |
| $Eu_2O_3$ | 0.025 mol |
| $AlF_3$ | 0.05 mol | chemical formula: $Ba_{0.95}MgAl_{10}O_{17}{:}Eu_{0.05}$

Embodiment Example 4 (Elementary Particle Eu Average Density: 1.0 mol %)

| | |
|---|---|
| $BaCO_3$ | 0.99 mol |
| MgO | 1.0 mol |
| $Al_2O_3$ | 5.0 mol |
| $Eu_2O_3$ | 0.005 mol |
| $AlF_3$ | 0.05 mol | chemical formula: $Ba_{0.95}MgAl_{10}O_{17}{:}Eu_{0.05}$

Next, a process to raise the Eu average density at and in a vicinity of the particle surface with respect to the phosphor particles of embodiment examples 1 to 4 was performed.

Specifically, Eu raw material at 5.0 mol % (0.025 mol % for embodiment example 1) of the $EuO_3$ raw material mixed during phosphor synthesis was adhered to the surface of the phosphor particles.

The Eu average density at and in a vicinity of the particle surface of each phosphor particle was then raised by heat treating the particles at 800° C. for 20 minutes in an oxygen atmosphere.

The divalent Eu-activated alkaline-earth metal aluminate phosphors of embodiment examples 1 to 4 were obtained as a result of the above processes.

The raw material amounts of the comparative examples were set as described below. The baking, powderizing, sizing and drying processes were similar to those performed in making the embodiment examples.

Comparative Example 1: similar phosphor composition to embodiment example 1, but Eu average density (10 mol %) is uniform for each particle as a whole:

| | |
|---|---|
| BaCO$_3$ | 0.9 mol |
| MgO | 1.0 mol |
| Al$_2$O$_3$ | 5.0 mol |
| Eu$_2$O$_3$ | 0.05 mol |
| AlF$_3$ | 0.05 mol | chemical formula: Ba$_{0.9}$MgAl$_{10}$O$_{17}$:Eu$_{0.1}$

Comparative Example 2: similar phosphor composition to embodiment example 2, but Eu average density (17 mol %) is uniform for each particle as a whole:

| | |
|---|---|
| BaCO$_3$ | 0.83 mol |
| MgO | 1.0 mol |
| Al$_2$O$_3$ | 5.0 mol |
| Eu$_2$O$_3$ | 0.085 mol |
| AlF$_3$ | 0.05 mol | chemical formula: Ba$_{0.83}$MgAl$_{10}$O$_{17}$:Eu$_{0.17}$

Comparative Example 3: similar phosphor composition to embodiment example 3, but Eu average density (5.0 mol %) is uniform for each particle as a whole:

| | |
|---|---|
| BaCO$_3$ | 0.95 mol |
| MgO | 1.0 mol |
| Al$_2$O$_3$ | 5.0 mol |
| Eu$_2$O$_3$ | 0.025 mol |
| AlF$_3$ | 0.05 mol | chemical formula: Ba$_{0.95}$MgAl$_{10}$O$_{17}$:Eu$_{0.05}$

Comparative Example 4: Eu average density (25 mol %) is set higher than embodiment example 4, and Eu average density is uniform for each particle as a whole:

| | |
|---|---|
| BaCO$_3$ | 0.75 mol |
| MgO | 1.0 mol |
| Al$_2$O$_3$ | 5.0 mol |
| Eu$_2$O$_3$ | 0.125 mol |
| AlF$_3$ | 0.05 mol | chemical formula: Ba$_{0.75}$MgAl$_{10}$O$_{17}$:Eu$_{0.25}$

Comparative Example 5 (overall Eu average density for each particle: 20 mol %): after making elementary particles having the following composition, processing was performed to increase the Eu average density at and in a vicinity of the particle surface (see Table 1 below for the density values of comparative examples 5–8).

| | |
|---|---|
| BaCO$_3$ | 0.8 mol |
| MgO | 1.0 mol |
| Al$_2$O$_3$ | 5.0 mol |
| Eu$_2$O$_3$ | 0.1 mol |
| AlF$_3$ | 0.05 mol | chemical formula: Ba$_{0.8}$MgAl$_{10}$O$_{17}$:Eu$_{0.2}$

The divalent Eu-activated alkaline-earth metal aluminate phosphors (elementary particles) of comparative example 5 expressed by the above chemical formula were thus obtained.

The Eu average density at and in a vicinity of the particle surface of these elementary particles (same as in embodiments 1–3) was then raised.

Comparative Example 6 (overall Eu average density for each particle: 3.0 mol %): after making elementary particles having the following composition, processing was performed to increase the Eu average density at and in a vicinity of the particle surface. Note that the 3.0 mol % value is lower than the optimal Eu density value for phosphor particles having a conventional structure.

| | |
|---|---|
| BaCO$_3$ | 0.97 mol |
| MgO | 1.0 mol |
| Al$_2$O$_3$ | 5.0 mol |
| Eu$_2$O$_3$ | 0.015 mol |
| AlF$_3$ | 0.05 mol | chemical formula: Ba$_{0.97}$MgAl$_{10}$O$_{17}$:Eu$_{0.3}$

Comparative Example 7 (overall Eu average density for each particle: 17 mol %): after making elementary particles having the following composition, processing was performed to increase the Eu average density at and in a vicinity of the particle surface. Note that the 17 mol % value is higher than the optimal Eu density value for phosphor particles having a conventional structure.

| | |
|---|---|
| BaCO$_3$ | 0.83 mol |
| MgO | 1.0 mol |
| Al$_2$O$_3$ | 5.0 mol |
| Eu$_2$O$_3$ | 0.085 mol |
| AlF$_3$ | 0.05 mol | chemical formula: Ba$_{0.83}$MgAl$_{10}$O$_{17}$:Eu$_{0.17}$

Next, the Eu average density at and in a vicinity of the particle surface of the elementary particles of comparative examples 5 to 7 was raised. This was carried out specifically by adhering the same amount of Eu raw material as used in the phosphor synthesis to the surface of the each elementary particle, and heat treating the resultant particles at 800° C. for 60 minutes in an oxygen atmosphere.

Comparative Example 8 (overall Eu average density for each particle: 5.0 mol %): after making elementary particles having the following composition, processing was performed to increase the Eu average density at and in a vicinity of the particle surface. While the Eu average density for each particle as a whole was set within what is considered to be an optimal value range, the Eu average density at and in a vicinity of the particle surface was set lower than the optimal value.

| | |
|---|---|
| BaCO$_3$ | 0.95 mol |
| MgO | 1.0 mol |
| Al$_2$O$_3$ | 5.0 mol |
| Eu$_2$O$_3$ | 0.025 mol |
| AlF$_3$ | 0.05 mol | chemical formula: $Ba_{0.95}MgAl_{10}O_{17}:Eu_{0.05}$

The Eu average density at and in a vicinity of the particle surface of these elementary particles was raised as follows. Specifically, 1.0% (i.e. 0.00025 mol %) of the Eu raw material used in the phosphor synthesis was adhered to the surface of each elementary particle, and the resultant particles were heat treated at 800° C. for 10 minutes in an oxygen atmosphere.

The divalent alkaline-earth metal aluminate phosphors of comparative examples 1 to 8 were obtained as described above.

4-2. X-Ray Analysis Measurements

X-ray analysis measurements were performed in relation to the alkaline-earth metal aluminate phosphors of embodiment examples 1 to 3 and comparative example 1 manufactured as described above to confirm the crystal structures. The experimentation conditions were as follows:

| X-ray source: | CuK α |
| tube voltage: | 40 kV |
| tube current: | 30 mA |
| scan speed: | 2° 2 θ/min | scattering slit (SS): 1°
divergence slit (DS): 1°
receiving slit (RS): 0.3 mm

Figure 4:
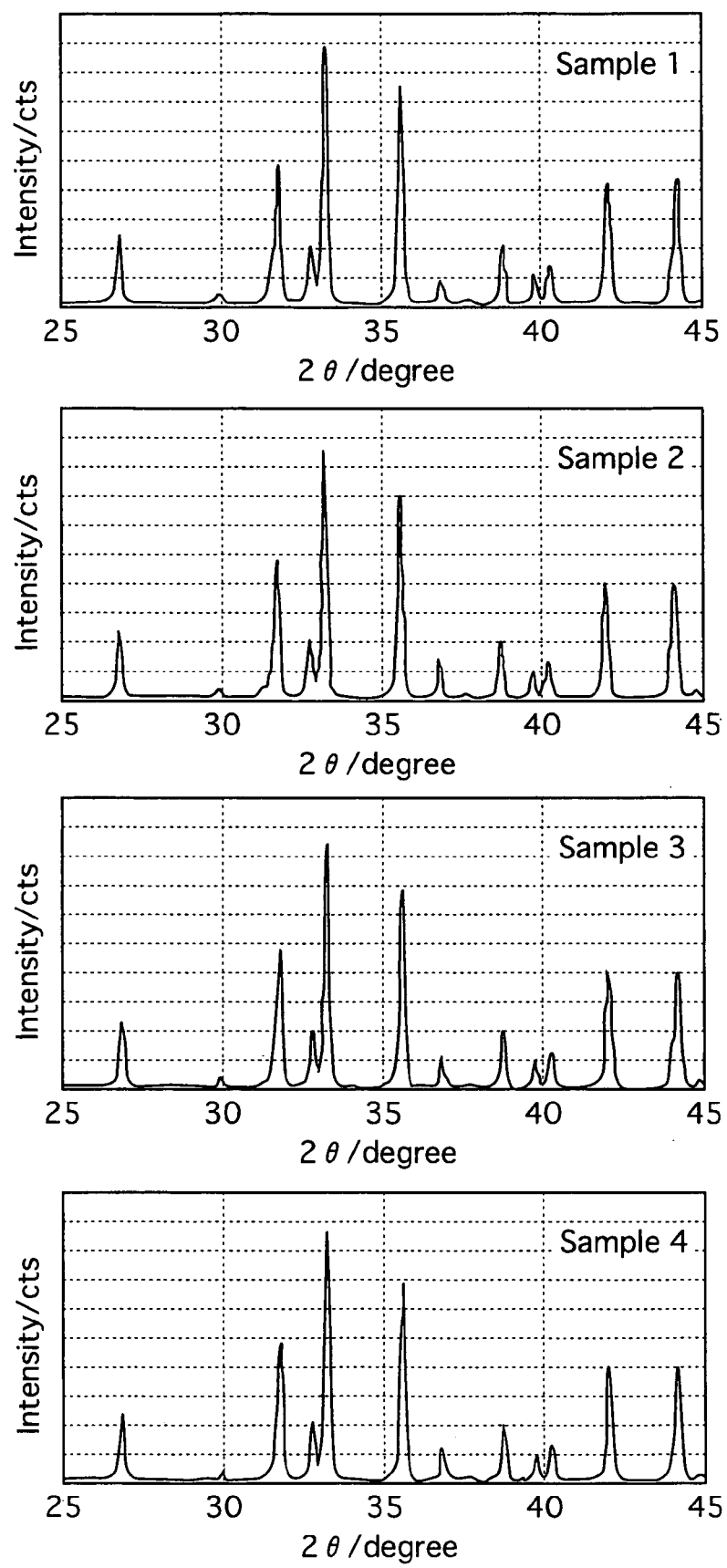
FIG. 4 shows phosphor particle-related data (X-ray diffraction measurement result)

The results of performing X-ray analysis measurements under the above conditions are shown in FIG. 4. Samples 1, 2, 3 and 4 equate to embodiment examples 1, 2 and 3 and comparative example 1, respectively.

As seen in FIG. 4, the peaks for the phosphor elementary particles of embodiment examples 1 to 3 are very similar to the peaks for the phosphor particles of comparative example 1.

This confirms that while there is a change in the Eu average density at and in a vicinity of the particle surface of the alkaline-earth metal aluminate phosphors using the elementary particles of embodiment examples 1 to 3, the crystal structure is substantially the same as conventional alkaline-earth metal aluminate phosphors (comparative example 1).

4-3. Luminescence Brightness Measurements

Luminescence brightness measurements were performed in relation to embodiment examples 1 to 4 and comparative examples 1 to 8. Specifically, the phosphor particles were irradiated with VUV light (146 nm wavelength) using an Xe UV light source, and the luminescence brightness (Y) and chromaticity (x,y) were measured.

The brightness and chromaticity y of embodiment examples 1 to 4 and comparative examples 1 to 8 were calculated and expressed as relative values, where the Y1/y1 ratio of embodiment example 1 was taken as 100% in order to compare the various phosphors. The results are tabulated in Table 1 below.

Should PDPs or fluorescent lamps constituted using the phosphors of the present invention ultimately reached the manufacturing stage, aging will preferably be performed to stabilize operation. Thus for comparative purposes, the phosphors measured for luminescence characteristics were again measured after being exposed to a discharge for 50 hours (pressure: 600 Torr; atmosphere: Ne 95 vol %+Xe 5.0 vol %), so as to achieve a performance similar to that of a PDP or fluorescent lamp that has undergone an aging process. The brightness and chromaticity after aging were calculated as Y2/y2, and expressed in Table 1 as relative values, with embodiment example 1 taken as 100%.

Note that Eu mol % ("Overall %" in Table 1) was derived using a redox titration technique after dissolving a sample in acid or an alkaline solution. In Table 1, "Surface %" expresses the Eu mol % at and in a vicinity of the particle surface.

TABLE 1

|  | Overall % | Surface % | Processing | Y1/y1(%) | Y2/y2(%) |
|---|---|---|---|---|---|
| Embod. Eg. 1 | 10 | 36 | Yes | 100 | 98 |
| Embod. Eg. 2 | 17 | 42 | Yes | 89 | 89 |
| Embod. Eg. 3 | 5 | 22 | Yes | 80 | 79 |
| Embod. Eg. 4 | 1 | 18 | Yes | 70 | 71 |
| Comp. Eg. 1 | 10 | 12 | No | 110 | 74 |
| Comp. Eg. 2 | 17 | 17 | No | 120 | 77 |
| Comp. Eg. 3 | 5 | 8 | No | 105 | 52 |
| Comp. Eg. 4 | 25 | 27 | No | 95 | 80 |
| Comp. Eg. 5 | 16 | 50 | Yes | 8 | 75 |
| Comp. Eg. 6 | 3 | 18 | Yes | 70 | 68 |
| Comp. Eg. 7 | 17 | 82 | Yes | 89 | 72 |
| Comp. Eg. 8 | 5 | 12 | Yes | 80 | 69 |

As shown by the Y1/y1 ratio in Table 1, the phosphor particles of embodiment examples 1 to 4 exhibit a performance level comparable to that of comparative examples 1–4 and 6–8. The luminescence efficiency of comparative example 5 is naturally reduced, given the originally low Eu average density.

On the other hand, it can be confirmed that the phosphors of embodiment examples 1 to 4 after the aging process were able to maintain excellent luminescence characteristics without being too adversely affected chemically by the aging. From this result it can be concluded that the phosphor particles of the present invention possess superior luminescence characteristics.

4-4. Compositional Analysis

The Eu average density at and in a near vicinity (i.e. near surface vicinity) of the particle surface ("Surface %" in Table 1) can be measured using an X-ray photoelectron spectroscopy (XPS) technique, for example.

With XPS, a sample surface is irradiated with X-rays of a known wavelength (generally AlK alpha or MgK alpha X-rays), and the energy (binding energy eV) of electrons that emit from the sample is measured. By comparatively monitoring the intensity of the energy, it is possible to selectively obtain information relating to the near surface vicinity up to a depth of 10 nm from the surface of different samples (here, phosphor particles).

Because XPS reveals the relative sensitivity factor (RSF) of the characteristics obtainable from an element, this technique can be used to measure the surface Eu average density of the phosphor particles and the composition ratio.

Note that the measurement values disclosed in the present invention were obtained using a PHI/1600S X-ray photoelectron spectroscopy device as the measurement device, while the X-ray source was MgK alpha X-rays.

Figure 5:
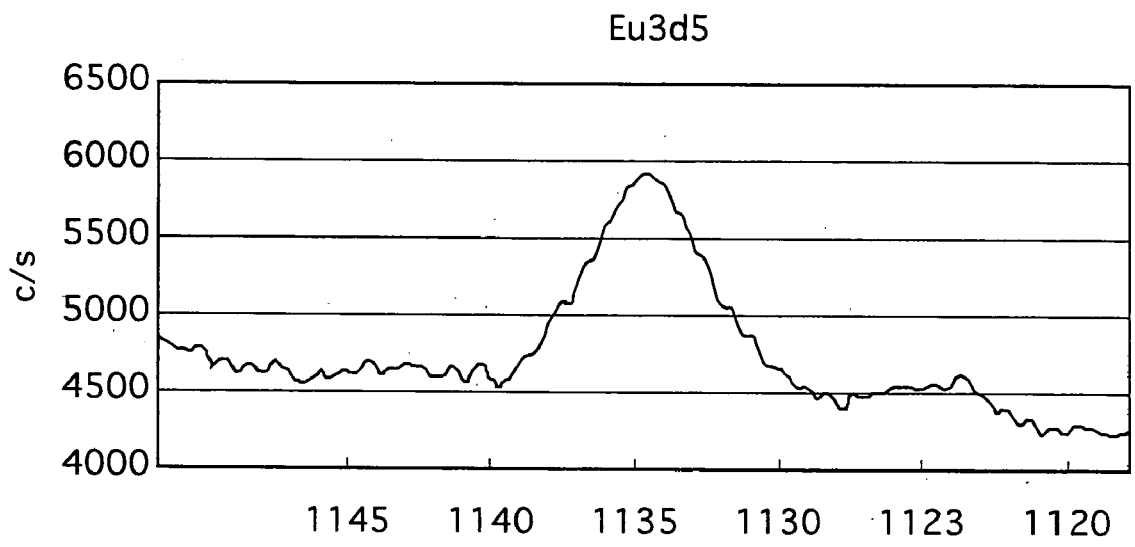
FIG. 5 shows phosphor particle-related data (X-ray photoelectron spectrum measurement result)
Figure 5:
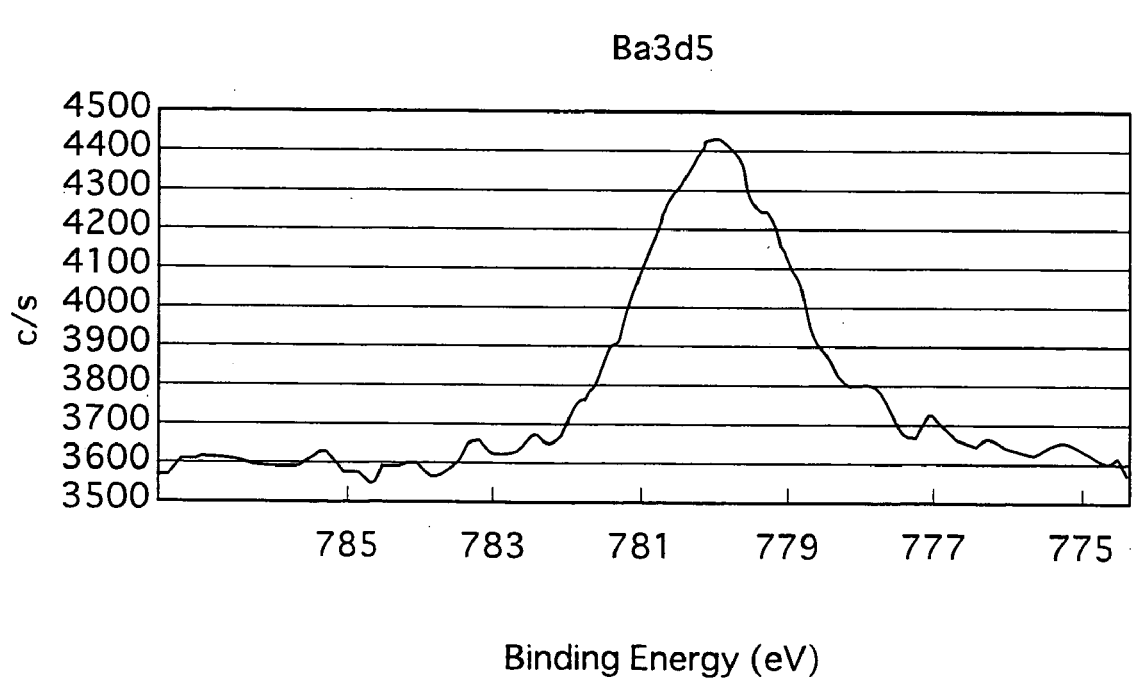

FIG. 5 shows exemplary measurement results relating to a sample 1 derived using XPS. With $BaMgAl_{10}O_{17}$:Eu phosphors, the peak relating to Eu3d5 appears in proximity of 1132 eV. The intensity ratio of the Eu peak and the alkaline-earth metal ("Ba" in sample 1) peak was derived, and converted using the RSF value. From the resultant value it is possible to calculate the density of the Eu and alkaline-earth metal phosphors.

Note that while the Eu average density in FIG. 5 is shown as a percentage (Surface %) of the total mole amount of Eu and alkaline-earth metal (here, Ba), the method of comparison is, needless to say, not limited to this method.

4-5. Other Embodiment and Comparative Examples

Performance comparison experiments were performed to compare aluminate phosphor performance using a comparative example 9 and an embodiment example 5 made separately to the above embodiment examples 1 to 4.

Embodiment example 5 was prepared by firstly making phosphor particles (elementary particles) consisting of components having a lower Eu average density than conventional levels, and then forming a high Eu average density region over the surface of the elementary particles.

The raw material amounts for embodiment example 5 (Eu: 5.0 mol %) were as follows:

| | |
|---|---|
| $BaCO_3$ | 0.9 mol |
| MgO | 0.9 mol |
| $Al_2O_3$ | 5.0 mol |
| $Eu_2O_3$ | 0.025 mol |
| $AlF_3$ | 0.01 mol |

These phosphor raw materials were mixed at the above amounts and then baked (140° C. max. temp. for 2 hrs in 10 vol % $H_2/N_2$ atmosphere). Powderizing, sizing and drying processes were performed on the result of the baking. The divalent Eu-activated alkaline-earth metal aluminate phosphors (used as elementary phosphors) of embodiment example 5 having the chemical formula $Ba_{0.95}MgO_{0.9}Al_{10}O_{17}:Eu_{0.05}$ were thus obtained.

The raw material amounts (same as prior art) for comparative example 9 (Eu: 10 mol %) were as follows:

| | |
|---|---|
| $BaCO_3$ | 0.9 mol |
| MgO | 1.0 mol |
| $Al_2O_3$ | 5.0 mol |
| $Eu_2O_3$ | 0.05 mol |
| $AlF_3$ | 0.01 mol |

These phosphor raw materials were mixed at the above amounts and then baked (140° C. max. temp. for 2 hrs in 10 vol % $H_2/N_2$ atmosphere). Powderizing, sizing and drying processes were performed on the result of the baking. The divalent Eu-activated alkaline-earth metal aluminate phosphors of comparative example 9 having the chemical formula $Ba_{0.9}MgAl_{10}O_{17}:Eu_{0.1}$ were thus obtained.

Luminescence Brightness Measurements

Next, the Eu density at and in a vicinity of the particle surface of the above elementary particles formed from the aluminate phosphors of embodiment example 5 was raised. Specifically, this was achieved by adhering Eu raw material at 1.0 mol % (i.e. 0.00025 mol %) of the amount used in the phosphor synthesis to the surface of the elementary particles, and heat treating the result at 800° C. for 20 minutes in an oxygen atmosphere.

Luminescence brightness was then measured for the phosphor particles of embodiment example 5 before heat treatment (i.e. elementary particles), the phosphor particles of embodiment example 5 after heat treatment (i.e. particles having high Eu density at particle surface/vicinity), and the phosphor particles of comparative example 9.

Specifically, the phosphor particles were irradiated with VUV light (147 nm wavelength) using an Xe UV light source, and the luminescence brightness (Y) and chromaticity were measured. In order to investigate the change in luminescence efficiency, the ratio (sustain rate) of luminescence efficiency pre heat treatment (Y) and post heat treatment (y) were derived.

Here, the sustain rates Y/y of the different phosphor particles were calculated with the brightness and chromaticity of comparative example 9, pre heat treatment embodiment example 5 (elementary particles) and post heat treatment embodiment example 5 (high Eu density at particle surface/vicinity) given as Y1/y1, Y2/y2, and Y3/y3, respectively.

The derived luminescence efficiency ratios (sustain rates) relating to embodiment example 5 and comparative example 9 are shown in FIG. 6.

FIG. 6 reveals that, with embodiment example 5, the post heat treatment sustain rate was the highest, in comparison with comparative example 9. Specifically, a comparison of embodiment example 5 (Y3/y3) with comparative example 9 (Y1/y1), which was manufactured in accordance with the stoichiometric composition ratio, confirms that the sustain rate of embodiment example 5 is superior. Thus we know that excellent luminescence brightness can be sustained for the phosphor particles of embodiment example 5, whose characteristics are resistant to change (e.g. oxidization) in the baking process.

5. Related Matters

The examples given in embodiments 2 and 3 use the alkaline-earth metal aluminate phosphors of the present invention in blue phosphors, although the present invention, not being limited to this, may also be applied in green phosphors. Furthermore, the alkaline-earth metal aluminate phosphors of the present invention may be used to structure only one of the colors blue and green.

The present invention is applied in phosphors used in a discharge space, in display devices (e.g. PDP) that use the phosphors in image display, and in fluorescent lamps that use the phosphors in visible light emission.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. Eu-activated phosphor particles comprising;
    an alkaline-earth metal aluminate phosphor particle composition, each particle having a higher Eu average density at and in a vicinity of a particle surface than for the particle as a whole.

2. Eu-activated phosphor particles comprising;
    an alkaline-earth metal aluminate phosphor composition defined by $Ba_{1-x-y}M_xEu_yMgAl_{10}O_{17}$, where $0.0 \leq x \leq 0.2$ and $0.01 \leq y < 0.17$ for each particle as a whole, and $0.17 \leq y < 0.8$ at and in the near vicinity of a surface of the particle, M being one of Sr and Ca.

3. The phosphor particles of claim 2, wherein $0.05 \leq y \leq 0.17$ for each particle as a whole.

4. A gas discharge display panel that performs image display using Eu-activated phosphor particles, each particle having a higher Eu average density at and in a vicinity of a particle surface than for each particle as a whole.

* * * * *

UNITED STATES PATENT AND TRADEMARK OFFICE
CERTIFICATE OF CORRECTION

PATENT NO. : 7,153,451 B2 Page 1 of 1
APPLICATION NO. : 10/867121
DATED : December 26, 2006
INVENTOR(S) : Zukawa et al.

It is certified that error appears in the above-identified patent and that said Letters Patent is hereby corrected as shown below:

In the Claims:
Column 18, line 60, "$0.05 \leqq y \leqq 0.17$" should be --$0.05 \leqq y < 0.17$--.

Signed and Sealed this

Third Day of April, 2007

JON W. DUDAS
*Director of the United States Patent and Trademark Office*